United States Patent Office 3,513,462
Patented May 19, 1970

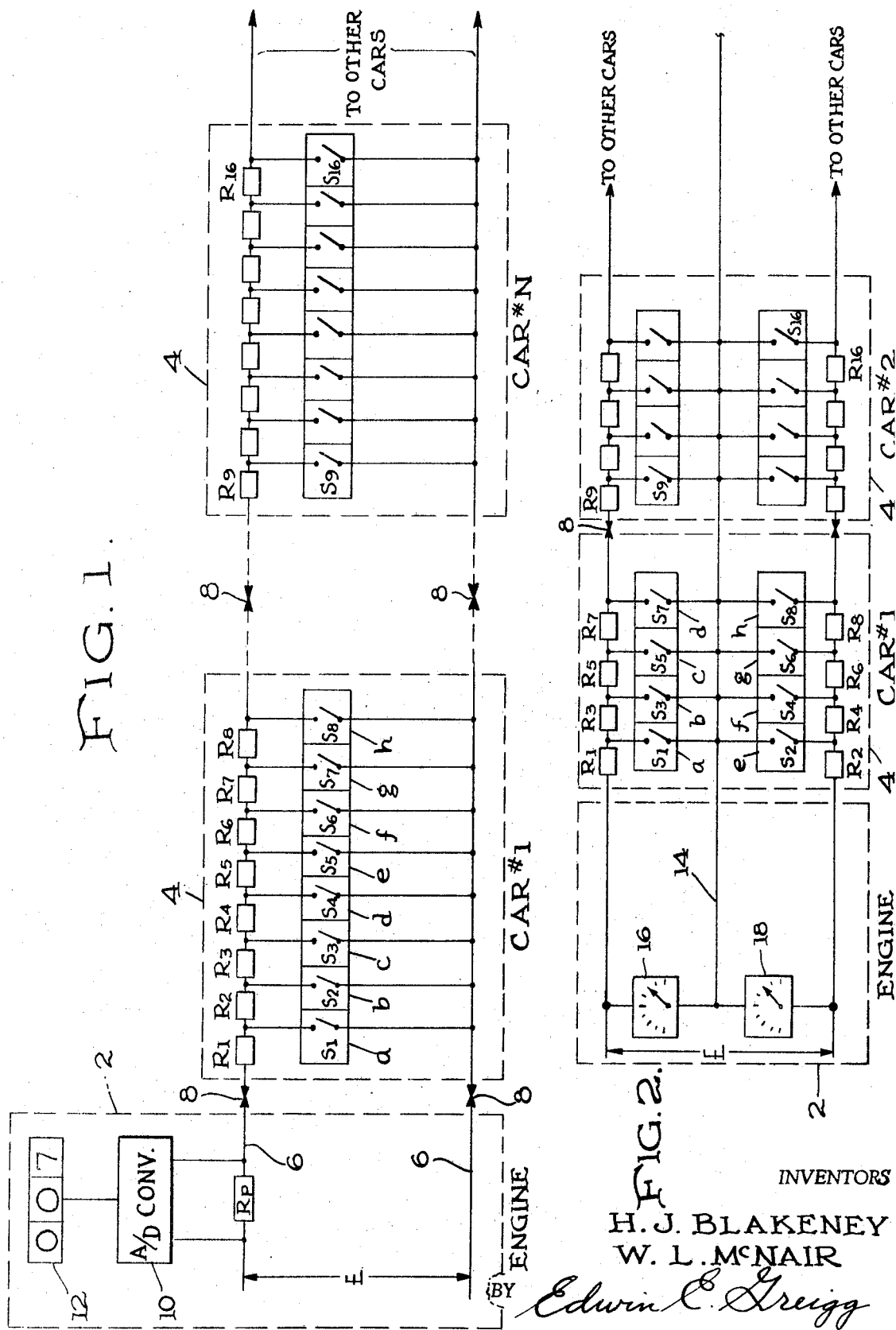

3,513,462
DETECTOR FOR HOT BOXES
Hurley J. Blakeney, North Walpole, N.H., and Willie L. McNair, Bellows Falls, Vt., assignors to Simmonds Precision Products, Inc., Tarrytown, N.Y., a corporation of New York
Filed Aug. 1, 1967, Ser. No. 657,611
Int. Cl. B61k 9/04; G08b 17/06
U.S. Cl. 340—231                3 Claims

ABSTRACT OF THE DISCLOSURE

A detection and locating system for hot box journal bearings utilizing a plurality of thermal-responsive switches each located in a respective hot box and connected in parallel in a circuit having a corresponding plurality of series-connected resistances interconnected with the switches, and a current-responsive resistance connected to an indicator for reading the value of voltage drop determined by the number of resistances energized when one of the switches is closed.

---

This invention relates to detectors for hot box bearing journals on railroad cars, and in particular to an analog or digital system which renders immediate indication to the operating engineer of excessive temperatures in hot box journals as well as their exact location.

With the advent of high speed trains and similar ground transportation systems there arises increased need for highly efficient control and maintenance systems. To this end, hot box journal bearing detection and correction plays a necessary role. At present the majority of the existing systems employ trackside stationary infra-red detectors and recorders with the detectors designed to sense the heat of the journal bearing by means of infra-red intensity of the external side of the journal box as the train passes by. This method is expensive and cumbersome in that detectors are required every approximate eight miles along the track which results in considerable delay in retrieving the information and in correcting the overheated journal. Other methods of simpler design analyze each journal bearing with a manual checking indicator when the train is stopped. Thus, maintenance personnel may check each journal bearing with a temperature-responsive chemical device. This method, however, has proved to be costly and time-consuming. Accordingly, it is the purpose of this invention to provide an economical and efficient system which is simple in design and reliable in operation and avoids the above-mentioned difficulties in existing systems.

Accordingly, it is the main object of this invention to provide an analog-digital indicating system which detects and locates hot box journal bearings to the engineer on the train as soon as said faults occur when the train is in motion.

It is another object of this invention to provide a low cost detection system for hot box journal bearings which utilizes a minimum of parts and can be used with existing standard diesel and steam-driven railroad cars or incorporated in newly developed high speed trains or similar ground transportation systems.

According to one embodiment utilizing the principles of this invention, a preset thermostatic switch is located in each of the eight journal boxes for each railroad car in operation. These switches are interconnected with respective series-connected resistors and are, in turn, connected to a common conductor. When a hot box occurs, the associated sensing switch closes and connects all the resistors that are in series up to the hot box. The number of resistors energized determines the current flow and the voltage drop across a suitable current sensing precision resistor and is then converted to a numerical readout on the indicator in the engine. The voltage drop across the current sensing resistor and hence the numerical readout is a function of the number of resistors connected in series by the thermostatic switch located in the hot box journal bearing.

Other objects and advantages will become apparent from a further study of the specification and drawings in which:

FIG. 1 is a schematic diagram showing the circuit according to this invention located on a train; and FIG. 2 is a schematic diagram showing a modification of the circuit shown in FIG. 1.

Referring now to FIG. 1, there is shown schematically a train having an engine 2 followed by a number of cars 4. As known, each of the railroad cars 4 usually has eight journal bearings or boxes shown schematically as $a$–$h$. It is to be understood, of course, that the invention can be used with any number of journal bearings and further that each of the cars 4 will be provided with the same circuit; it will suffice, therefore, to describe only one of the circuits for one of the cars 4. Positioned in each of the journal boxes $a$–$h$ is a preset thermostatic switch $S_1$–$S_8$ of the bimetallic type or the like which is set to close above a specified temperature. Each of the switches $S_1$–$S_8$ is, in turn, connected to respective fixed precision resistors $R_1$–$R_8$, all having the same value and all connected in series, as shown. The switches $S_1$–$S_8$ are connected to a common conductor 6 having a constant input D.C. voltage E. Suitable connectors 8 are provided for the conductor 6 to provide the necessary connection between the engine and the car as well as between the cars themselves. Located in the engine 2 and series-connected with the resistances $R_1$–$R_8$ is a current sensing precision resistor $R_p$. Connected across the resistance $R_p$ is an analog-to-digital converter 10 which is provided with a suitable digital counter 12.

In operation, the detecting circuit, according to this invention, functions as follows: when the hot box occurs, its associated sensing switch, that is, one of the switches $S_1$–$S_8$, will close and connect all the resistors in series from the D.C. input E up to the hot box. The number of resistors energized will determine the current flow and hence the voltage drop across the current sensing resistor $R_p$ located in the engine 2. This voltage drop is then converted to a numerical readout by means of the analog-to-digital converter 10 on the indicator digital counter 12, also located in the engine. For example, assuming that the journal bearing $g$ exceeds its normal temperature, the switch $S_7$ will then close and cause the resistors $R_1$, $R_2$, $R_3$, $R_4$, $R_5$, $R_6$ and $R_7$ to become energized in series with the D.C. input E and the current sensing resistor $R_p$. The resistors $R_1$–$R_7$ will then determine the amount of current flow and hence the voltage drop across $R_p$ and the digital readout, which is coded as is well known in the art, will read the number 007 on the indicator 12, thus rendering the exact location of the hot box $g$. The foregoing example illustrates a hot box indication and location for the first car following the engine, naturally, the hot boxes in each of the following cars in the train will be numbered consecutively such that each hot box will have its own identifying number when detected in the foregoing manner. If on occasion more than one hot box occurs, then the digital counter will indicate and locate the nearest hot box on the train since its associated thermal switch will close the circuit and connect all the resistors in series from the nearest hot box location up to the resistance $R_p$. When this situation occurs and the nearest hot box is corrected for its condition then that portion of the circuit will be opened allowing the remaining hot box, or one of the remaining hot boxes, to register the portion of its closed circuit on the digital counter in the manner above described. In this way, any number of hot box occurrences can be corrected immediately until the digital counter registers a zero reading representing an open circuit.

In FIG. 2 there is shown a modification of the circuit of FIG. 1 wherein the operation is similar except that the total resistance read, instead of undergoing an analog-to-digital conversion, is rendered as an output in an analog dial indication. For this purpose, two circuits are provided, one for the left side of the train and one for the right side of the train. It will suffice to describe the circuitry for one car insofar as the circuitry is similar for each of the cars of the train. As in the case of FIG. 1, each of the journal boxes $a$–$h$ is provided with a preset thermostatic switch $S_1$–$S_8$ as above described. Now the switches $S_1$–$S_8$ are connected to a conductor 14 common to a left side circuit and a right side circuit. The left side circuit includes switches $S_1$, $S_3$, $S_5$ and $S_7$, all located in their respective journal boxes on that side of the train. These switches, in turn, are interconnected with resistors $R_1$, $R_3$, $R_5$ and $R_7$ connected in series, as shown. The right side circuit is similarly arranged in the manner described for the left side circuit. Suitable connectors 8 are provided for connecting the circuits between the engine and the car and between the cars themselves. Located in the engine are a pair of ohmmeter type indicators 16, 18, one for the left side circuit and one for the right side circuit, as shown. The dial on each of the ohmmeters is graduated in the number of journals, with full scale indicating maximum number of journals on a given side of the train. Operation of the circuit is similar to that described for FIG. 1, except now the output from the series-connected resistors is in the form of an analog dial indication.

As previously mentioned, it is necessary to provide suitable connectors for connecting the wiring between cars. In order to minimize wiring between the cars, it is contemplated that the train track itself might be used as the return conductor, in which case only one wire would be required for interconnection between the cars in the embodiment shown in FIG. 1, and only two wires would be required in the embodiment shown in FIG. 2.

What is claimed is:

1. In a system for detecting and locating hot box journal bearings identifiable in numerical sequence in a ground transportation system, the combination comprising a circuit having a D.C. supply voltage, a plurality of normally open thermal-responsive switches connected in parallel in said circuit, each of said switches located in a respective one of said journal bearings, a corresponding plurality of resistances having equal fixed values connected in series in said circuit and interconnecting said plurality of thermal-responsive switches, a current-responsive means connected in series with said resistances, and an analog-to-digital converter having a digital counter indicator connected across said current-responsive means for indicating a numerical readout value of current flow in said resistances corresponding to one of said journal bearings when one of said plurality of thermal-responsive switches is closed.

2. In a system for indicating and locating hot box journal bearings identifiable in numerical sequence in a ground transportation system, comprising a circuit having a D.C. input voltage, a plurality of normally open thermal-responsive switches connected in parallel in said circuit, each of said switches located in a respective one of said journal bearings, a corresponding plurality of resistances having equal value connected in series with said circuit, each of said resistances forming a closed circuit with each of said thermal-responsive switches, current-responsive means connected in said circuit for supplying a voltage drop thereacross in response to the current flow through said resistances when one of said thermal-responsive switches is closed, and an analog-to-digital converter connected across said current-responsive means having a digital counter indicator for identifying said closed thermal-responsive switch in response to said voltage drop across said current-responsive means.

3. In a system for detecting and locating hot box journal bearings identifiable in two groups of numerical sequence in a ground transportation system, the combination comprising a circuit having a D.C. input voltage, a first group of normally open thermally-responsive switches connected in parallel in said circuit, a second group of normally open thermally-responsive switches connected in parallel in said circuit, said switches connected to a common conductor in said circuit, and each of said switches located in a respective one of said journal bearings, a first group of resistances having equal value connected in series in said circuit and interconnecting said first group of switches, a second group of resistances having equal value connected in series in said circuit and interconnecting said second group of switches, and first and second current-responsive means for indicating the current flow through said first and second group of resistances when one of said first and second group of switches is closed.

References Cited

UNITED STATES PATENTS

| 2,560,753 | 7/1951 | Weinberg | 340—231 X |
| 3,059,107 | 10/1962 | McCool | 340—231 X |

JOHN W. CALDWELL, Primary Examiner

P. PALAN, Assistant Examiner

U.S. Cl. X.R.

246—169